(12) United States Patent
López Sánchez (10) Patent No.: US 8,951,618 B2
(45) Date of Patent: Feb. 10, 2015

(54) HOLLOW PANEL AND MOULD FOR THE MANUFACTURE THEREOF

(76) Inventor: Manuel López Sánchez, A Coruna (ES)

( * ) Notice: Subject to any disclaimer, the term of this patent is extended or adjusted under 35 U.S.C. 154(b) by 103 days.

(21) Appl. No.: 13/879,945

(22) PCT Filed: Sep. 9, 2011

(86) PCT No.: PCT/ES2011/000285
§ 371 (c)(1),
(2), (4) Date: Aug. 29, 2013

(87) PCT Pub. No.: WO2012/052576
PCT Pub. Date: Apr. 26, 2012

(65) Prior Publication Data
US 2013/0344262 A1    Dec. 26, 2013

(30) Foreign Application Priority Data
Oct. 22, 2010   (ES) .................................. 201001377

(51) Int. Cl.
*B27M 3/00* (2006.01)
*B27N 5/02* (2006.01)
(Continued)

(52) U.S. Cl.
CPC ... *B32B 3/10* (2013.01); *B27N 5/00* (2013.01); *B32B 3/28* (2013.01); *B32B 3/30* (2013.01); *B32B 21/02* (2013.01); *B32B 21/13* (2013.01); *B32B 3/12* (2013.01); *B32B 2250/03* (2013.01); *B32B 2250/40* (2013.01); *B32B 2479/00* (2013.01); *B32B 2607/00* (2013.01); *B32B 37/12* (2013.01)

USPC ....... 428/35.6; 428/34.2; 428/116; 156/583.1

(58) Field of Classification Search
USPC ...................... 428/34.2, 35.6, 116; 156/583.1
See application file for complete search history.

(56) References Cited

U.S. PATENT DOCUMENTS

| 3,534,439 A | 10/1970 | Haas et al. |
| 4,544,342 A | 10/1985 | Werz et al. |
| 2006/0134385 A1 | 6/2006 | Vaders |

FOREIGN PATENT DOCUMENTS

| EP | 1400636 A1 | 3/2004 |
| ES | 2029229 T3 | 8/1992 |

(Continued)

OTHER PUBLICATIONS

International Search Report for corresponding application No. PCT/ES2011/000285 filed Sep. 19, 2011; Mail date Feb. 9, 2012.

*Primary Examiner* — Michael C Miggins (57) ABSTRACT

A hollow panel including a hollow central board or body and two external sheets forming a sandwich, the central body being made of wood fiber and glues and made in a mold, the mold having an uneven surface with oblique walls and truncated vertices where, the external sheets, made form the same material as the central body, are joined using the same glues, and the mold has a fixed peripheral frame, a thrust platform and a heating plate with a serrated plate to which another, similar plate is brought close such that the two serrated plates constitutes the mold, where the latter plate is rigidly secured to the upper hot plate of the press for forming the central board or body, and the teeth of the two plates are offset in a staggered pattern, and do not meet, to form the uneven surface with the desired thickness.

6 Claims, 12 Drawing Sheets (51) Int. Cl.
*B32B 3/10* (2006.01)
*B27N 5/00* (2006.01)
*B32B 3/28* (2006.01)
*B32B 3/30* (2006.01)
*B32B 21/02* (2006.01)
*B32B 21/13* (2006.01)
*B32B 3/12* (2006.01)
*B32B 37/12* (2006.01)

(56) References Cited

FOREIGN PATENT DOCUMENTS

| | | |
|---|---|---|
| ES | 2289928 A1 | 2/2008 |
| ES | 2296543 A1 | 4/2008 |
| ES | 2325712 A1 | 9/2009 |
| ES | 2328203 A1 | 11/2009 |
| ES | 2334082 A1 | 3/2010 |
| GB | 1286469 | 8/1972 |
| JP | 2005186503 A | 7/2005 |
| WO | 9840205 A1 | 9/1998 |

HOLLOW PANEL AND MOULD FOR THE MANUFACTURE THEREOF

CROSS REFERENCE TO RELATED APPLICATION

This application is a national stage entry of PCT/ES2011/000285 filed Sep. 19, 2011, under the International Convention claiming priority over Spain Patent Application No. P201001377 filed Oct. 22, 2010.

TECHNICAL FIELD

The present invention, as expressed in the heading of this specification, relates to a mold for the manufacture of hollow panels and the panel manufactured with said mold, having very advantageous characteristics in the production of this type of hollow panels. They enable the construction of furniture using panels of little weight instead of solid ones or panels manufactured traditionally using a central reinforcement of strips forming a framework and the two external sheets that give the assembly a sandwich structure.

BRIEF SUMMARY OF RELATED ART

Currently hollow panels or hollow doors are manufactured which include a framework or hollow central ore formed by crossbeams and longitudinal beams where to different plywood covers are attached, joined with adhesives or glues.

There is also a light type of hollow doors that include as central core said framework and an internal honeycomb structure as sufficiently resistant reinforcement to at least maintain the parallel nature of the covers of the sandwich structure.

It is important to highlight that the present invention considerably improves the patents owned by the inventor no. P200702385 and P200701709, as they manage to resolve a series of problems that these patents had in their execution and manufacturing.

On the other hand, with respect to the mold whereby the cores or central panels of hollow panels are manufactured in accordance with the present invention, we can cite Patent of Invention no. P-200601305 of the same applicant of the present invention, wherein it provides that door cores can be formed with the hollows for paneling or glazing so that material is not wasted since the core of the door is perfectly finished and completed, only lacking the final veneering and without requiring any machining.

This Patent of Invention provides that the mold both for hollow doors and for hollow panels is formed by a fixed peripheral frame which follows the contour of the door core, or a multiple of the surface thereof to be able to simultaneously obtain several door cores in the same pressing phase, later being separated by cuts.

The lower horizontal platform is vertically displaceable by way of a plunger by hydraulic cylinders, resting thereon a first rectangular framework adjusted to the dimensions of the hollow of the peripheral frame and which can slide telescopically in the interior, having as many windows on its surface as door cores are provided in the mold. These windows receive in turn second frameworks independent from one another but which are also telescopically displaceable, including therein the respective hollows if any for paneling or glazing.

The mold is located in a frame press and so that the upper moving and hot plate of the press closes the mold on contacting with the fixed peripheral frame. The hollows to panel or glaze are occupied with metal blocks that remain fixed in a raised position and flush with the peripheral frame of the mold.

The first and second or second rectangular frameworks are actuated hydraulically from below and constitute in themselves the lower hot plate of the press since they are heat resistant. The blocks that prevent the product from accessing the mold surface, located in the place where it is designed that the hollows for paneling or glazing are formed, are maintained in a raised position by the hydraulic cylinders that serve them, and if the door is compact, i.e. solid, and without hollows for paneling or glazing, the second frame is solid and all its surface will receive the blanket of wood fiber and glue.

In Patent of Invention no. P-200602572 which is also of the same applicant of the present invention, improvements are provided in the aforementioned structure, whereby it achieves and automatism and versatility in the manufacturing of different types and models of doors with a same mold. For this it has a rectangular frame with different spaces or windows with the contour of the core of the door to be manufactured, to simultaneously achieve several totally finished units defining a composite mold. The blocks that occupy the position of the cavities to panel or glaze are defined by a plurality of transversal elements that can be individually displaced, having the same or different width.

The useful surface of the first rectangular framework defines an area where a greater amount of product is received since it lowers to a greater extent that the rest does, so that a considerably greater density is obtained in the pressing than in the rest.

The first and second rectangular frameworks, as well as the independent intermediate blocks that the hollows for paneling or glazing can be formed with, are supported by vertical rods passing through an upper horizontal platform that is actuated by the lower hydraulic cylinders of the press, an operation which is performed once the upper hot plate of the press has covered the mold.

In the Certificate of Addition no. P-200701308 to the main Patent of Invention no. P-200602572 commented above, improvements are provided in the mold for the manufacture of door cores which are centered both on the fixed part of the mold and the raising and lowering structure of the first and second frameworks to vary the displacement path depending on the thickness that the doors core must have.

With regard to the rectangular frame or walls of the mold wherein several units can be manufactured in the same pressing phase, instead of being fixed to manufacture standard door cores, it is divided in two parts: one fixed external part peripheral to each independent unit and another moving internal one displaceable telescopically therein and able to occupy two positions: an upper one which remains flush with the external peripheral part to manufacture standard door cores and another lower position for the manufacture of door cores of greater dimensions in length and width, as they lower to the same extent as the first rectangular framework to receive a greater volume of material to press.

The hydraulic cylinders that serve these first and second frameworks are extended or withdrawn to the desired extent depending on the order received from the automatic computer-controlled unit that the installation includes. The admission movements (downward) are sequential during the advance of the dosage apparatus that supply the product to press, since in the displacement towards one side of the press the product contained in the hoppers is discharged which, in this case, may be OM or wood fiber and glue with different densities when sandwich type cores or doors are manufactured. When the moving frame wherein the one or more dosage apparatus are mounted exits the press, the pressing is performed and thus when it returns to the other side the removal of the manufactured door cores has simultaneously taken place, which is carried out at the same time as the upper plate of the press has been raised and the lower cylinders thereof have been extended to remove the door core from the mold.

The dosage apparatus includes a large central hopper with the product which must constitute the central area of the sandwich of the two-density door and another two smaller side hoppers which contain the product of the standard layers thereof. In the bottom of the hoppers there are rotating blade rollers that distribute the product towards the sides and furthermore the entire bottom of the hopper is occupied by two conveyer belts which advance towards the center where there are rollers with blades in charge of filling the mold. In the lower part of this displaceable chassis or carriage, there are cleaning rollers on the surface of the mold to avoid undesired incrustations from forming.

BRIEF SUMMARY

It is important to highlight that the present invention considerably improves the patents owned by the inventor, no. P200702385 and P200701709, as it manages to resolve a series of problems that these patents have in their execution and manufacturing. In general terms, the mold for the manufacture of hollow panels, as well as the hollow panel obtained by the mold, proposed by the invention, allow the construction of a hollow panel which, even being of the type of those formed by a hollow central panel and two external sheets or covers which give the assembly a sandwich structure, offers the special characteristic that the central panel or core of the sandwich is constructed by molding.

The hollow core has as novel solution compared with that commented in the previous section, the geometric form of its central core and specifically of the hollow area thereof, being differentiated there from by the uniform geometric distribution of the recesses which are determined and which, in this case, are established as truncated pyramid or truncated conical inlets disposed both longitudinally and transversally, i.e. in two perpendicular directions and in total symmetry.

As regards the lateral sheets of this sandwich, if offers the advantage that they are also of the same pressed material of wood fiber or MDF and urea-formaldehyde glues and they are joined to the central body with this same type of glue.

The recesses of one face, preferably trunk-pyramid, are offset with respect to the other face to form walls of little thickness, thus achieving the proper resistance and also lightening the weight, in addition to forming the panel on attaching the external sheets to this central core. This hollow panel can be marketed alone, i.e. without the external covers of the sandwich, or it can be supplied just lacking the final finish (lacquering, rejection of wood) on both faces and thus it is used by furniture manufacturers to be cut into small pieces by cutting to the desired measurements, or as decorative panels.

To achieve these hollows or recesses on molding the central core, the serrated plate of the bottom of the mold and that attached to the upper hot plate of the press are determined by separate plates whose faces incorporate a plurality of truncated pyramid or truncated conical protuberances, with the commented distribution, to form the recesses in the blanket of wood fiber and glues poured into the mold by the corresponding dosage apparatus, as it is deposited on the bottom plate and as the hot plate lowers to close the mold.

The vertices of this serrated surface constructed in the mold are truncated to increase the gluing surface of the external covers or sheets of the sandwich.

For its part, the mold is loaded with the product of a single density which is found in a measuring hopper disposed in a carriage which has a swinging movement from one side to the other of the mold, exiting the press to allow the upper hot plate to lower to close in the top part the mold. This plate includes another plate with serrated profile similar to the lower one but with its teeth offset in a staggered pattern, and both do not meet, to form the uneven surface with the desired thickness.

In these conditions before the filling of the mold the lower hydraulic cylinders of the press act making the thrust platform rise to determine the gauge of the blanket, in addition to making the final pressing of the panel, which, once set, will also perform the function of demolding. After this initial step and once the mold has been filled, the upper serrated plate which has a flat peripheral extension with respect to its serrated area lowers since the mold has to totally close. The serration is only localized in the central area, although it is large.

In the pressing, the upper protuberances interconnect with the lower ones without establishing contact and the walls of the planned thickness are formed with them. In addition to it being possible to achieve the different core thicknesses by varying the path of the thrust platform, by a gauge system, the serrated plates can also be interchanged with others that have the protuberances of the suitable length.

To facilitate the understanding of the characteristics of the invention and forming an integral part of this specification, sheets of plans are attached in the figures whereof the following has been represented with illustrative and non-limiting character:

DESCRIPTION OF A PREFERRED EMBODIMENT

Figure 1:
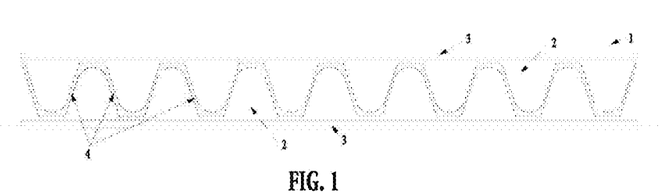
FIG. 1.—Is an elevation cross-section of a hollow panel formed by a hollow central body and two external panels or sheets acquiring a sandwich structure, in accordance with the invention.
Figure 2:
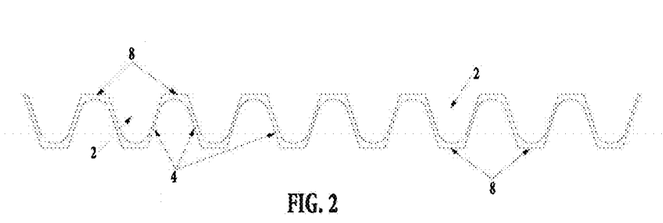
FIG. 2.—Is a view similar to FIG. 1, observing only the hollow central body, as made in the mold.
Figure 3A:
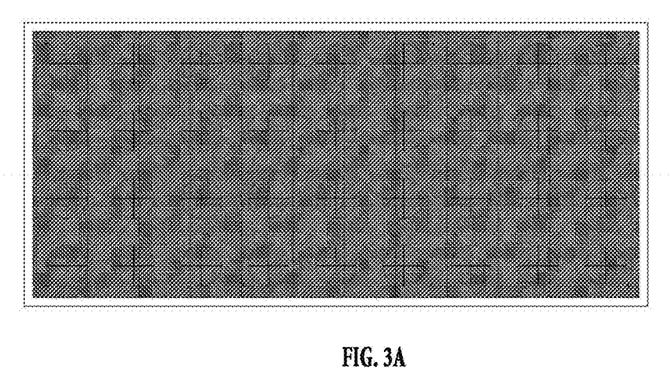
FIG. 3A.—Detail of plan view of the upper central body.
Figure 3B:
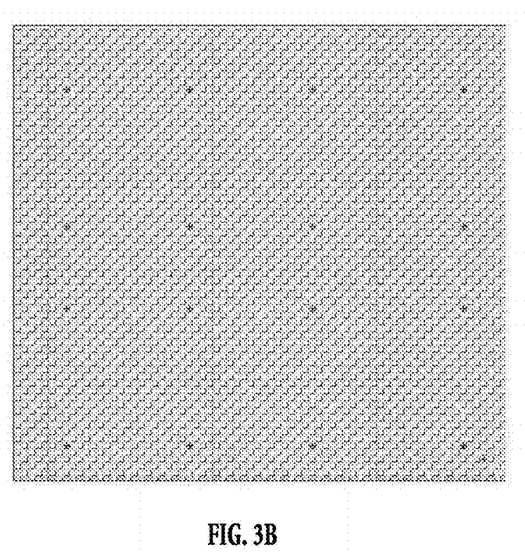
FIG. 3B.—Detail of plan view of the lower central body.

Making reference to the numbering adopted in figures and in particular FIGS. 1 to 3, the hollow panel is generally referred to with number (1) and has a sandwich structure formed by the hollow central body (2) which is the part obtained by pressing in the mold, and two external covers or sheets (3).

The core or central panel (2) constitutes in itself the most novel part of the invention since it is formed by the pressing of wood fiber and urea-formaldehyde glues, by heat received from the hot plates of the frame press wherein it is found and of which the mold forms part as we will see later on.

The central panel (2) has a structure formed by oblique partitions (4) in zigzag by way of an accordion but which do not reach the edges of the panel.

When the sheets (3) are later glued to this central panel (2), the hollow panel (1) becomes very resistant and light.

The zigzag disposal of the hollow body is formed on incorporating serrated plates (6) and (7) in the hot plates of the press, which in the pressing phase interconnect without joining together, the thickness of the partitions (4) of the core or central panel (2) defining their separation. The product pressed between the plates (6) and (7) offers the interlinked disposal of oblique partitions with the truncated vertices defining surfaces (8) of application of the adhesive joining the external covers (3).

Figure 8:
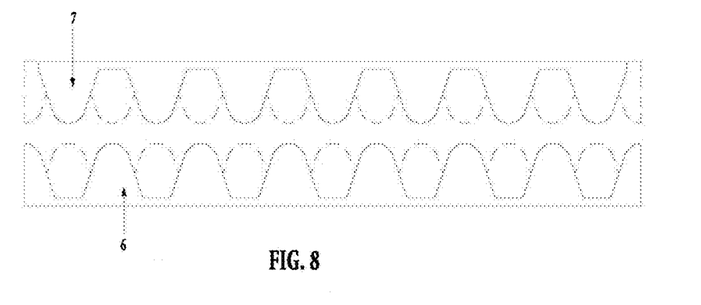
FIG. 8.—Is a partial elevation and profile view, of he serrated plates rigidly fixed to the lower and upper hot plate of the press to obtain the hollow central body.
Figure 12:
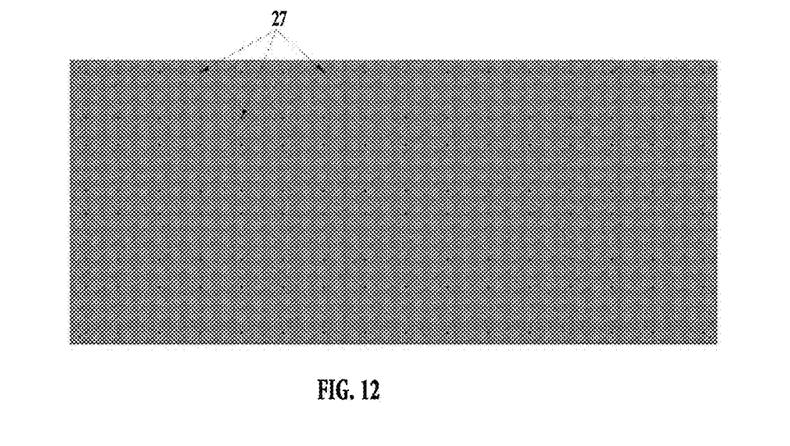
FIG. 12.—Is a view of the lower mold serration, representing the thrusters that pull off the panel from the mold.
Figure 13:
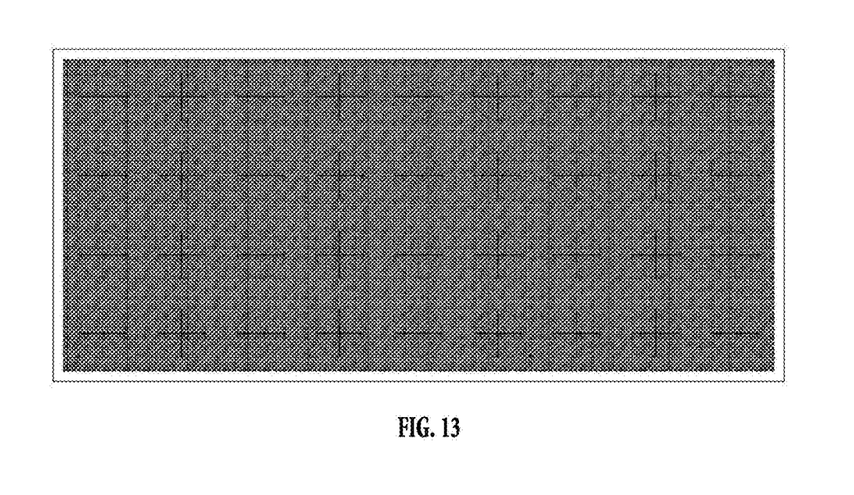
FIG. 13.—Is a view of the upper mold serration, representing the upper hydraulic cylinders that close the press.

Therefore, the troughs of the serration of the serrated plates (6) and (7) are flat. The peaks of the teeth are rounded to facilitate the demolding, whilst increasing resistance (see FIGS. 8, 12 and 13).

In FIGS. 4 to 7 we see the frame press (10) provided with the lower hydraulic cylinders (11) which perform three functions in the total of the process: first they lift the mold to the height we determine for the thickness of the blanket formed by the product (14). Once the mold is formed with the product (14), dosed and poured from the measuring hopper (15) of the displaceable carriage (16) holding the wheels (17) (FIG. 10) and which circulate along the tracks (18) rigidly secured to the frames of the press (FIG. 6), and the upper hot plate (12) has lowered when the upper cylinders (13) actuate, the mold closes and the thrust platform (30) is raised in the pressing operation until reaching gauges.

Figure 9:
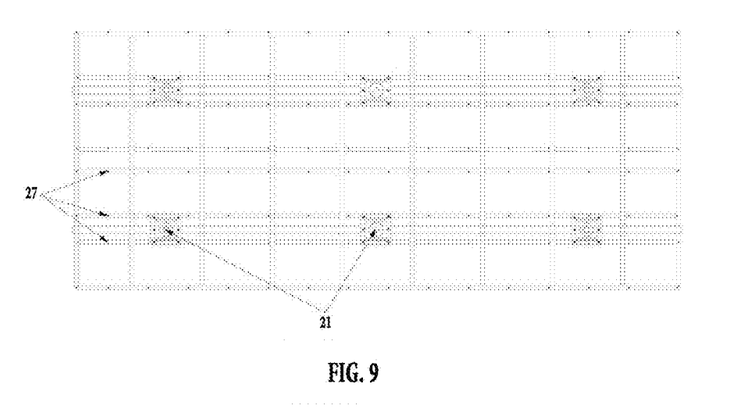
FIG. 9.—Is a plan view of the demolding system of the mold panel once the press is open, and we can also observe thrusters which have the function of pulling off the panel from said mold serration.

Later, the upper hot plate (12) is lifted by means of the hydraulic cylinders (9) and the hydraulic cylinders (11) are raised, the core (2) is thrust by said cylinders to the height of the peripheral frame (19), then, and as we can observe in FIG. 9, a group of thrusters (27) rise to pull the panel off the mold serration (6), said thrusters are actuated by the pneumatic cylinders (21).

Once outside the mold the core is removed by one of the carriages with grippers (not represented in the drawings) to the stacking area of the hollow panel whilst the hopper again fills the mold. When the carriage (16) exits, a new pressing takes place at the opposite side of the press and then it is the other carriage with grippers from the other opposite side of the carriage (16) which removes it, whilst the mold is again filled with the hopper (15).

Figure 5:
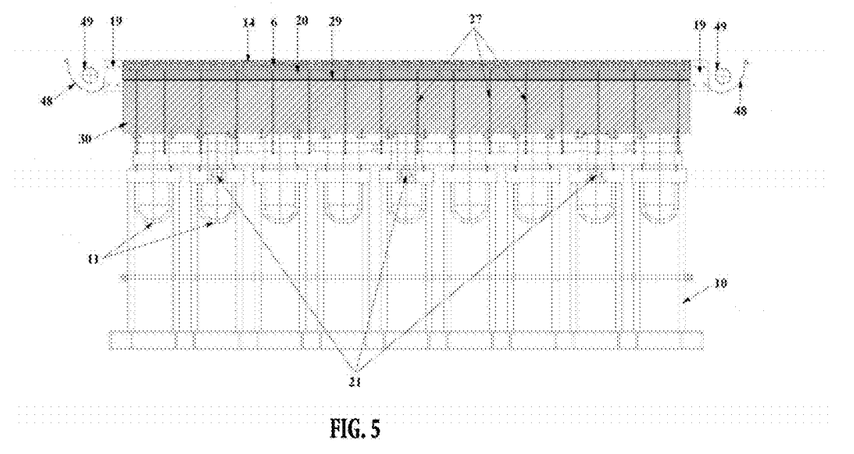
FIG. 5.—Is a view similar to FIG. 4, without including the measuring hopper or the upper part of the press.
Figure 14:
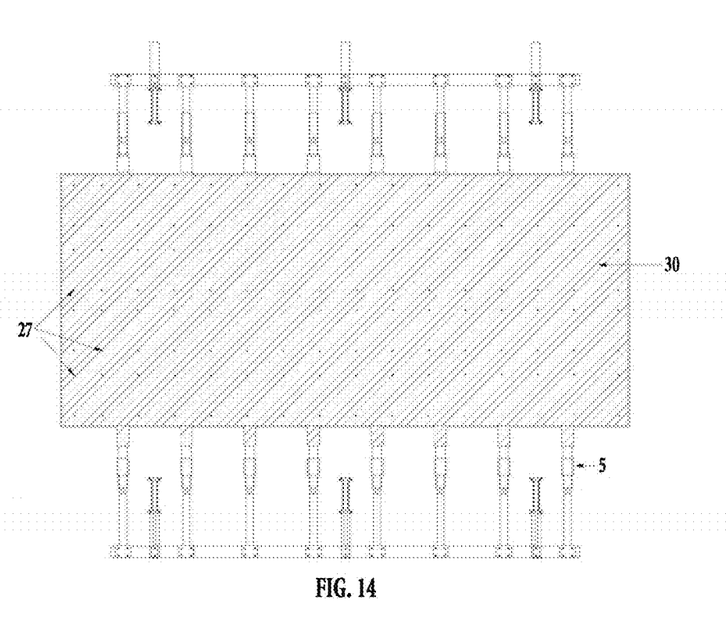
FIG. 14.—Plan view of the thrust platform, representing the thruster for pulling off the panel from the mold and the gauges of the thickness of the end panel.
Figure 15:
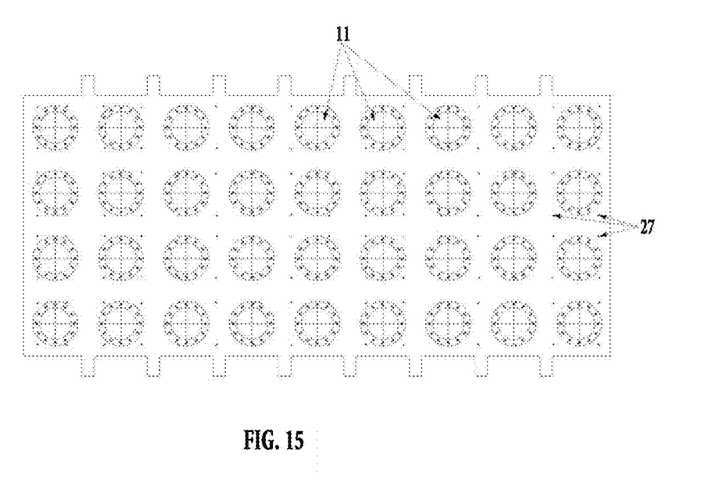
FIG. 15.—Represents the thrust platform with the hydraulic cylinders and the thruster for pulling off the panel from the lower mold.
Figure 16:
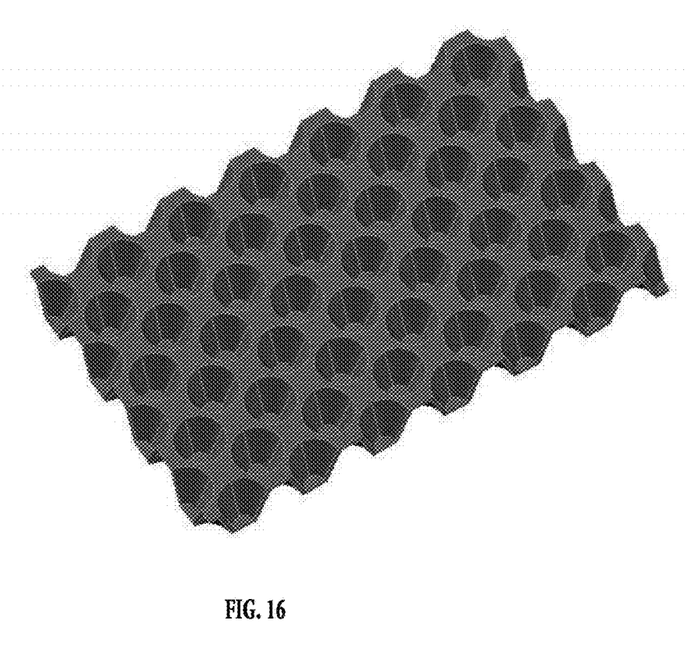
FIG. 16.—View in 3 dimensions of the core of FIG. 8.

As seen in FIG. 5, the serrated plate (6) of the bottom of the mold is fixed to the heating plate (20), this in turn rests on an insulating sheet (29) which prevents transmitting heat to the thrust platform (30) (FIG. 14) and which is displaceable downward to receive the product (14) to press (see FIG. 5), which takes place by a series of hydraulic cylinders (11), FIG. 15. The product (14) received in the mold (6) is called product blanket; this blanket is pressed to a certain gauge which can be variable depending on its thickness and is determined by the gauges (5) (FIGS. 6 and 14).

Figure 4:
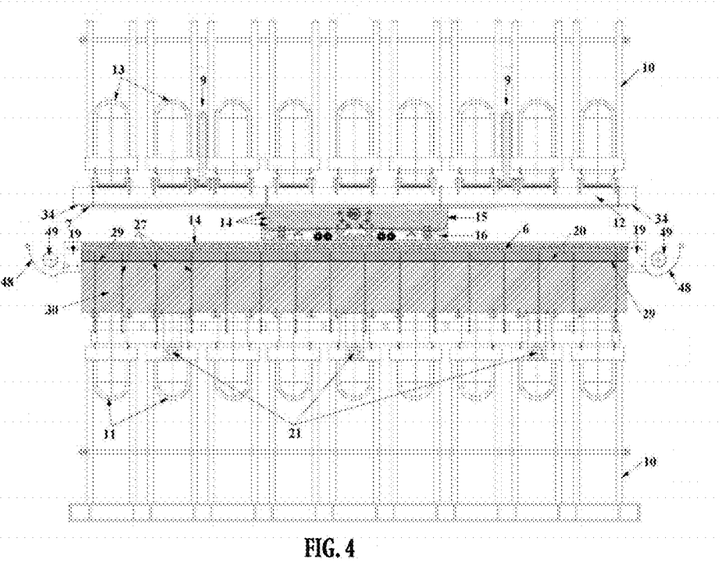
FIG. 4.—Is a longitudinal elevation view of the mold for the simultaneous manufacture of a hollow panel, disposed in a frame press and with the measuring hopper situated on the mold.
Figure 6:
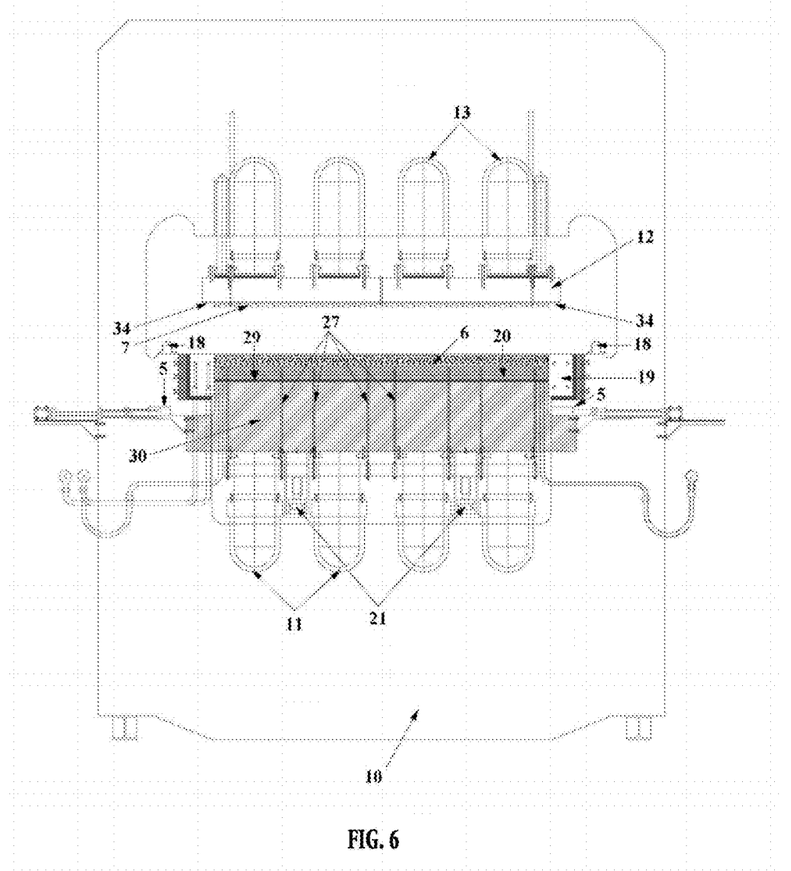
FIG. 6.—Is an elevation cross-section of that shown in FIG. 4, without including the measuring hopper.
Figure 7:
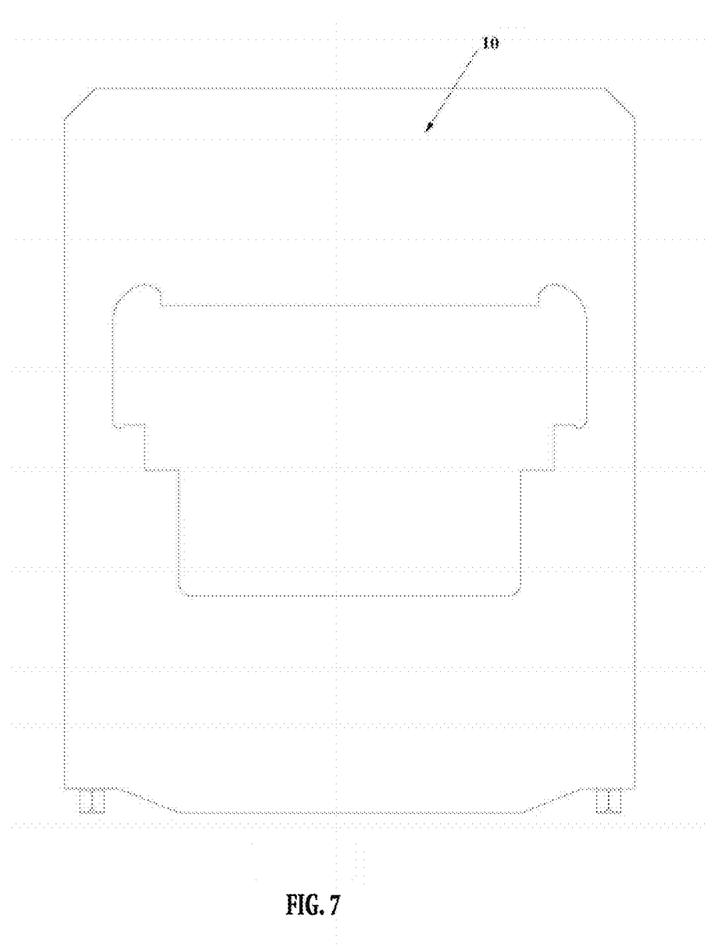
FIG. 7.—Is a view of the frame of the press.

Something similar happens on the upper surface of the core, since on closing the mold (lowering the upper hot plate 12 with its serrated plate 7) the flat extensions (34) of said upper plate (7) close the mold (FIGS. 4 and 6).

On the other hand, the hopper (15) containing the product (14) is outside the press, on one side or the other thereof, to allow the lowering of the upper hot plate which closes the mold to perform its compacting.

Figure 10:
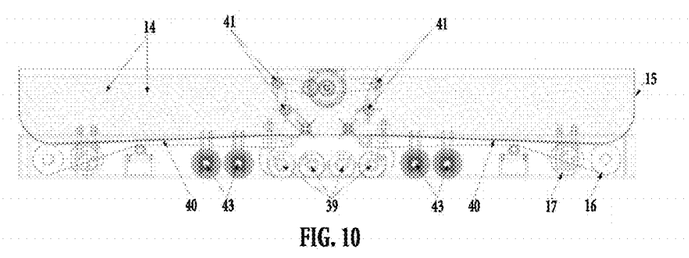
FIG. 10.—Is a longitudinal elevation view, according to the displacement, of the measuring hopper of the moving carriage.
Figure 11:
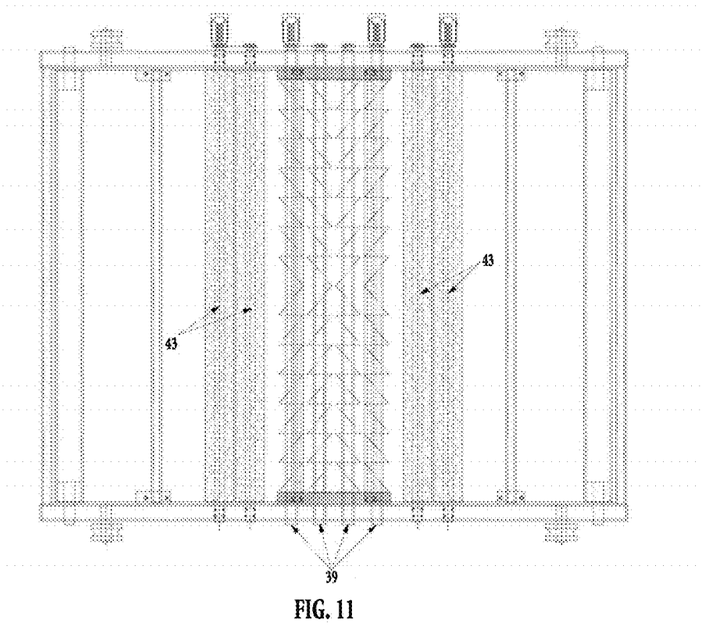
FIG. 11.—Is a plan view of that shown in FIG. 10.

FIGS. 10 and 11 show the geometry of the carriage (16) with the large hopper (15) containing the product (14). As it advances, the product dosed with the four central rotating rollers (39), provided with blades and which are perfectly supplied with product (14) by the two conveyer belts (40) which advance towards the center, are discharged. There are distributors (41) (see FIG. 10) which help the distribution to be uniform along the whole width of the mold.

FIG. 11 shows the lower plant where four cleaning rollers (43) can be distinguished, which are longer and sweep the horizontal surface of the peripheral frame, avoiding incrustations.

It has also been provided that the surplus product swept by the cleaning rollers (43) is collected in one or another channel (48) provided at the ends of the mold, being redirected for its recovery with the rotation of separate worm gears (49) disposed in the bottom of the respective channel (48). (FIG. 4).

The invention claimed is:

1. Mold for manufacture of hollow panels, being of the type that include a hollow central panel and two external covering sheets joined with adhesive to the central panel, and the mold being disposed in a frame press an upper hot plate whereof is raised to allow entry of a dosage apparatus which discharges in the mold a product of wood fiber and glues, which then lowers in a pressing phase closing the mold in a top part, a lower hot plate of the press defining a displaceable bottom of the mold, the mold comprising:

a fixed peripheral frame of dimensions corresponding to a panel;

a heating plate which can be vertically displaced by hydraulic cylinders, a free surface of said heating plate being occupied by a first serrated profile plate which forms the mold of striations parallel with an angle and desired height, being interchangeable;

a thrust platform and a heating plate, actuated by the hydraulic cylinders of the press, a second serrated plate which forms part of the mold, the second plate being rigidly secured to the upper hot plate of the press, with an identical serration to that of the first serrated plate but offset in a staggered pattern with respect thereto to form oblique walls of the hollow central body of the hollow panel.

2. Mold for the manufacture of hollow panels, according to claim 1, wherein the dosage carriage can move from one side of the mold to another to discharge the product contained in a large measuring hopper equipped with rotating rollers in transversal disposal and equipped with radial blades to discharge the product which accesses on two conveyer belts collateral thereto and which is mixed in this central area by two blade distributors which access transversally and guide the product so that the distribution is uniform along a whole width of the mold.

3. Mold for the manufacture of hollow panels, according to claim 2, wherein the dosage carriage includes in a front and rear area, in a direction of a swinging movement, lower sweeping rollers that clean the mold surface and unify a poured layer of product.

4. Mold for the manufacture of hollow panels, according to claim 3, wherein the excess product swept by the rollers is collected in one or another channel provided at ends of the mold and carried for recovery with different worm gears of a bottom of the respective channel.

5. Hollow panel, comprising:
   a sandwich structure defined by a hollow central panel or body and
   a honeycomb structure, closed on both sides with sheets or covers joined by gluing,
   wherein the hollow central body is formed by a pressed layer of wood fiber and urea-formaldehyde glues forming an uneven surface of oblique transversal walls in zigzag with V-shaped profile of truncated vertices, parallel bands corresponding to truncations for application of the adhesive joining the external sheets or covers of the sandwich being coplanar.

6. Hollow panel, according to claim 5, wherein the external sheets or covers are also made of wood fiber or MDF and urea-formaldehyde glues, of a desired thickness.

\* \* \* \* \*